United States Patent [19]

Iwasaki

[11] Patent Number: 5,081,349
[45] Date of Patent: Jan. 14, 1992

[54] SCANNING MICROSCOPE AND SCANNING MECHANISM FOR THE SAME

[75] Inventor: Osamu Iwasaki, Kanagawa, Japan

[73] Assignee: Fuji Photo Film Co., Ltd., Kanagawa, Japan

[21] Appl. No.: 608,920

[22] Filed: Nov. 5, 1990

[30] Foreign Application Priority Data

Nov. 6, 1989 [JP] Japan ................... 1-288405

[51] Int. Cl.⁵ .............................. H01J 3/14; H01J 5/16
[52] U.S. Cl. ....................... 250/234; 359/368
[58] Field of Search ............... 250/234, 216; 350/507, 350/509; 356/349, 359

[56] References Cited

U.S. PATENT DOCUMENTS

| 4,584,484 | 4/1986 | Hutchin | 350/509 |
| 4,614,410 | 9/1986 | Ikenaga et al. | 350/507 |
| 4,734,578 | 3/1988 | Horikawa | 250/234 |
| 4,893,008 | 1/1990 | Horikawa | 250/234 |

FOREIGN PATENT DOCUMENTS 209510 9/1987 Japan .
306414 12/1988 Japan .

Primary Examiner—David C. Nelms
Assistant Examiner—Stephone Allen
Attorney, Agent, or Firm—Sughrue, Mion, Zinn, Macpeak & Seas

[57] ABSTRACT

A scanning microscope comprises an objective lens for converging a laser beam, which serves as a light beam irradiated to a sample, to a small light spot on the sample, and a scanning mechanism for scanning the light spot on the sample in a main scanning direction and a sub-scanning direction. The light beam, which is radiated out of the sample during the scanning, is photoelectrically detected and converted into an image signal representing an enlarged image of the sample. The scanning mechanism is provided with a main scanning device comprising a beam splitter, which splits the laser beam into two laser beams such that their center points deviate from each other, a light modulating device, which regularly modulates the intensity of at least one of the two laser beams such that the modulation frequency varies for the two laser beams, and an optical device, which adjusts the beam profiles of the laser beams on the sample such that the beam profiles have a flat shape which is long in the direction along which the two laser beams are lined up.

6 Claims, 3 Drawing Sheets

SCANNING MICROSCOPE AND SCANNING MECHANISM FOR THE SAME

BACKGROUND OF THE INVENTION

1. Field of the Invention

This invention relates to a scanning microscope. This invention particularly relates to a scanning microscope provided with an improved mechanism for scanning a sample with a light beam. This invention also relates to a novel scanning mechanism for use in a scanning microscope.

2. Description of the Prior Art

Optical type scanning microscopes have heretofore been used. With the scanning microscope, a laser beam, which serves as a light beam, is converged by an objective lens to a small light spot on a sample, and the sample is scanned with the light spot in a main scanning direction and a sub-scanning direction. The light beam, which has passed through the sample during the scanning, or the light beam, which has been reflected from the sample during the scanning, is detected by a photodetector. An enlarged image of the sample is thereby obtained. Examples of the scanning microscopes are disclosed in Japanese Unexamined Patent Publication Nos. 62(1987)-209510 and 63(1988)-306414.

The conventional scanning microscope utilizes one of the following scanning mechanisms:

(1) a mechanism which two-dimensionally moves the sample supporting member, and (2) a mechanism which two-dimensionally deflects the laser beam by a light deflector.

However, the scanning mechanism described in (1) has the problem in that the sample flies out of its correct position when it is scanned quickly.

With the scanning mechanism described in (2), the aforesaid problem does not occur, and therefore quick scanning can be achieved. For example, with a scanning mechanism wherein an acousto-optic deflector (AOD) is utilized, the scanning can be carried out with a frequency of as high as 15.75 kHz. In such cases, the period, with which the main scanning is carried out, is equal to $1/(15.75 \times 10^3)$ second. Therefore, for example, when the number of the main scanning lines is 500, the time required for a single image to be formed is as short as approximately 1/30 second. Accordingly, a single image can be formed nearly in the real time mode.

However, in cases where an image signal representing a two-dimensional image of a sample is generated each time the focusing plane is moved, and a three-dimensional image is reconstructed from the image signals thus obtained from a plurality of focusing planes, it is necessary that several tens to several hundreds of two dimensional images of the sample be formed. In such cases, if the imaging speed is on the order described above, it will take several seconds to several tens of seconds for all of the necessary two-dimensional images of the sample to be formed.

SUMMARY OF THE INVENTION

The primary object of the present invention is to provide a scanning microscope wherein the scanning with a laser beam is carried out very quickly.

Another object of the present invention is to provide a novel scanning mechanism for use in the scanning microscope.

The present invention provides a scanning microscope comprising:

i) an objective lens for converging a laser beam, which serves as a light beam irradiated to a sample, to a small light spot on said sample, ii) a scanning mechanism for scanning said light spot on said sample in a main scanning direction and a sub-scanning direction, and iii) a means for photoelectrically detecting the light beam, which is radiated out of said sample during the scanning, and thereby generating an image signal representing an enlarged image of said sample, wherein said scanning mechanism is provided with a main scanning means which is composed of:

a) a beam splitting means, which splits said laser beam into two laser beams such that center points of two said laser beams deviate from each other, two said laser beams being caused to impinge upon said objective lens, b) a light modulating means, which regularly modulates the intensity of at least one of two said laser beams such that the modulation frequency varies for two said laser beams, and c) an optical device, which adjusts the beam profiles of the laser beams on said sample such that the beam profiles have a flat shape which is long in the direction along which two said laser beams are lined up.

With the scanning microscope in accordance with the present invention, an interference fringe is formed by the two laser beams. The interference fringe extends in a direction which intersects the direction along which the two laser beams are lined up. The interference fringe moves in the direction along which the two laser beams are lined up. Also, by adjusting the beam profiles on the sample in the manner described above, the interference fringe takes on the form of a small spot on the sample. Therefore, the spot-like interference fringe moves on the sample, and the sample is scanned with the light spot in one direction (i.e. in the main scanning direction).

When the modulation frequencies of the two laser beams are equal to f1 and f2 (where f1<f2), the interference fringe occurs sequentially with a frequency which is equal to the difference, $\Delta f = f2 - f1$. Therefore, the main scanning with the light spot can be repeated with the frequency which is equal to $\Delta f$. For example, a certain acousto-optic modulator (AOM) can modulate light with a modulation frequency of as high as several hundreds of megahertz. Theoretically, in cases where one of the two laser beams is modulated with such an AOM and the other laser beam is not modulated, the main scanning can be carried out with a frequency, $\Delta f$, of as high as several hundreds of megahertz. By way of example, the main scanning frequency may be set to $\Delta f = 1.575$ MHz with the upper limit of the sub-scanning speed and the response speed of a photodetector being taken into consideration. In such cases, the main scanning speed becomes 100 times the speed which can be achieved when an AOD having a scanning frequency of 15.75 kHz is utilized as the main scanning means.

With the scanning microscope in accordance with the present invention, the laser beam irradiated to the sample is split into two laser beams, and an interference fringe is formed by the two laser beams. The interference fringe takes on the form of a small light spot on the sample. Also, at least one of the two laser beams is modulated, and the interference fringe is caused to move. In this manner, the light spot is caused to scan the sample in the main scanning direction. Therefore, the main scanning can be carried out very quickly. Accordingly, with the scanning microscope in accordance with the present invention, in cases where very many two-dimensional images of the sample are formed and thereafter a three-dimensional image of the sample is reconstructed from the two-dimensional images, the reconstructed image can be obtained very quickly.

The present invention also provides a scanning mechanism having an objective lens for converging a laser beam, which serves as a light beam irradiated to a material to be scanned, to a small light spot on said material to be scanned, said light spot being caused to scan said material, which is to be scanned, in a main scanning direction and a sub-scanning direction, wherein the improvement comprises the provision of a main scanning means which is composed of:

a) a beam splitting means, which splits said laser beam into two laser beams such that center points of two said laser beams deviate from each other, two said laser beams being caused to impinge upon said objective lens, b) a light modulating means, which regularly modulates the intensity of at least one of two said laser beams such that the modulation frequency varies for two said laser beams, and c) an optical device, which adjusts the beam profiles of the laser beams on said material to be scanned such that the beam profiles have a flat shape which is long in the direction along which two said laser beams are lined up.

DESCRIPTION OF THE PREFERRED EMBODIMENTS

The present invention will hereinbelow be described in further detail with reference to the accompanying drawings.

Figure 1:
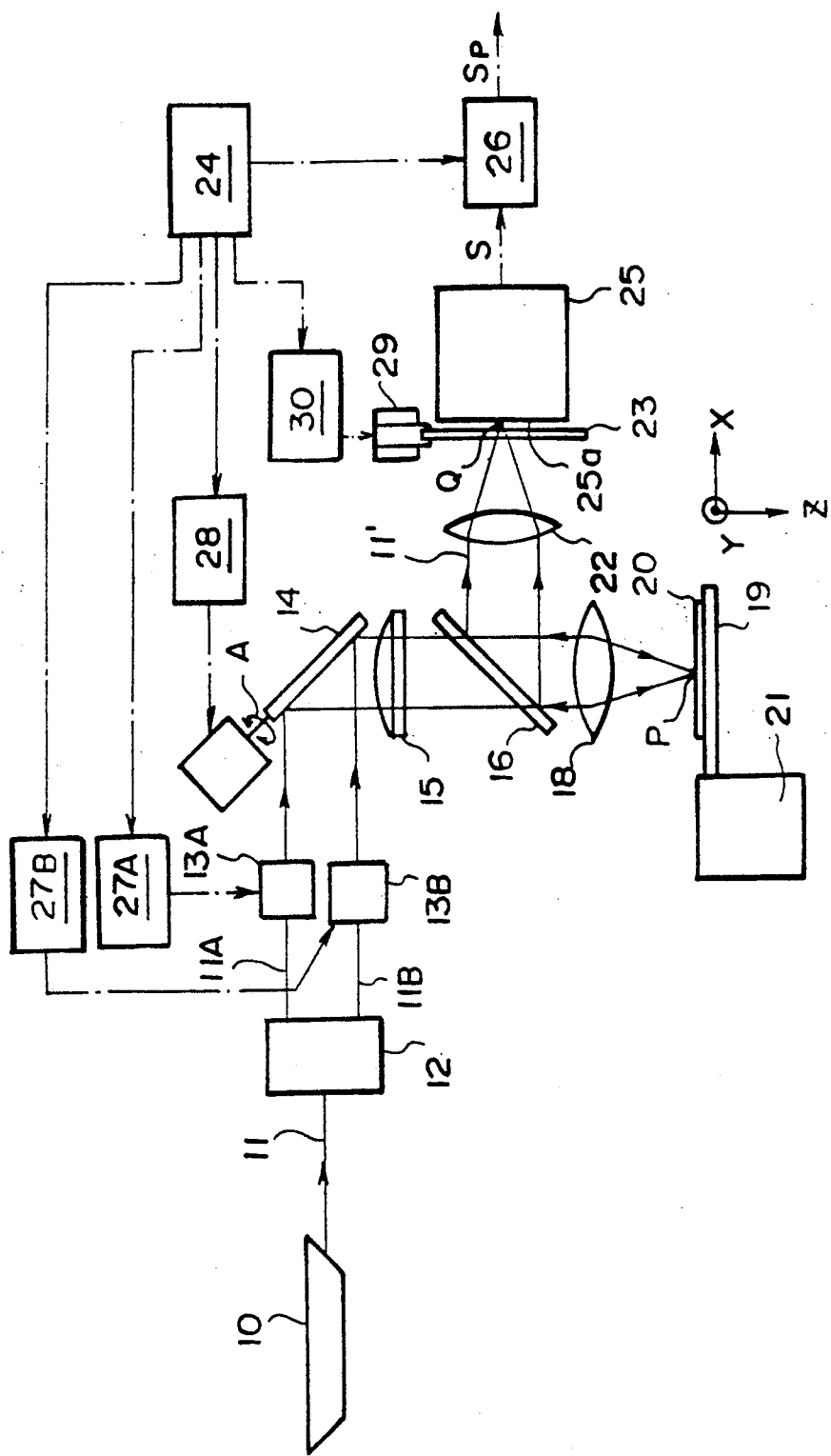
FIG. 1 is a schematic side view showing a first embodiment of the scanning microscope in accordance with the present invention.

FIG. 1 is a schematic side view showing a first embodiment of the scanning microscope in accordance with the present invention, which is of a reflection type.

With reference to FIG. 1, a laser beam 11 is produced as a collimated light beam by a laser beam source 10. The laser beam 11 is split by a beam splitter 12 into laser beams 11A and 11B such that the center points of the laser beams 11A and 11B deviate from each other. The laser beam 11A passes through an acousto-optic modulator (AOM) 13A, which regularly modulates the intensity of the laser beam 11A with a modulation frequency f1. The laser beam 11B passes through an AOM 13B, which regularly modulates the intensity of the laser beam 11B with a modulation frequency f2. The modulation frequency f1 and the modulation frequency f2 are different from each other. After being modulated, the laser beams 11A and 11B impinge upon a galvanometer mirror 14, which serves as a sub-scanning means and which rotates reciprocally in directions indicated by the double headed arrow A. The laser beams 11A and 11B are reflected and deflected by the galvanometer mirror 14.

The laser beams 11A and 11B, which have thus been deflected by the galvanometer mirror 14, impinge upon a cylindrical lens 15, which is combined with the galvanometer mirror 14. The cylindrical lens 15 is located such that it can converge the laser beams 11A and 11B with respect to the direction along which the laser beams 11A and 11B are lined up. Also, the positions, at which the beam waists of the laser beams 11A and 11B are formed, coincide with the position corresponding to the focal point on the beam incidence side of an objective lens 18. The laser beams 11A and 11B, which have thus been converged by the cylindrical lens 15, pass through a semi-transparent mirror 16 and then impinge upon the objective lens 18. The laser beams 11A and 11B are converged by the objective lens 18, and the beam profiles of the laser beams 11A and 11B on a sample 20 are adjusted such that the beam profiles have a flat shape (an elliptic shape in this embodiment) which is long in the direction along which the laser beams 11A and 11B are lined up.

Figure 2:
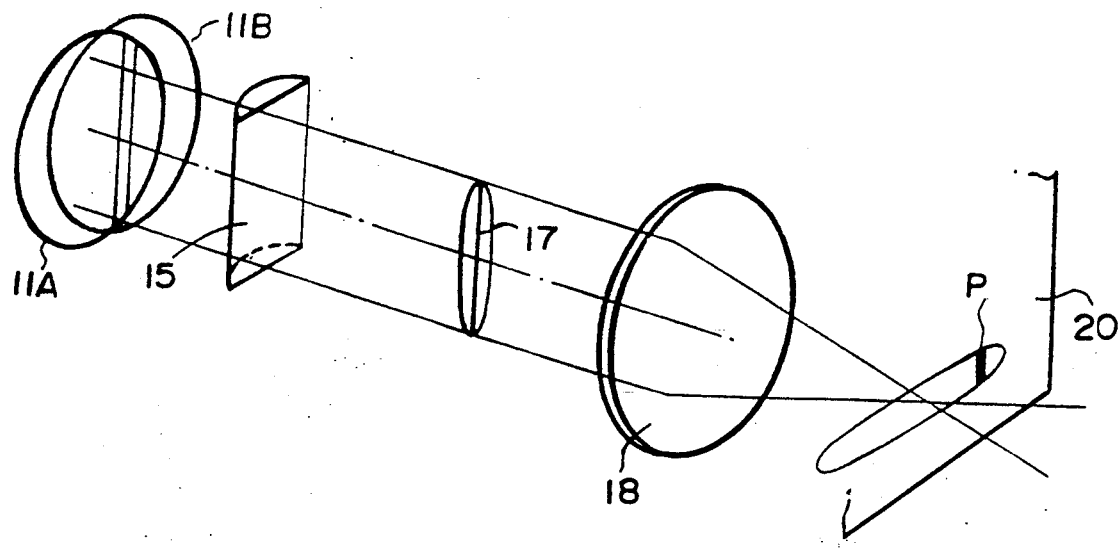
FIG. 2 is an explanatory view showing part of the first embodiment shown in FIG. 1.

As shown in FIG. 2, an interference fringe 17 occurs at the position at which the laser beams 11A and 11B overlap one upon the other. Because the beam profiles of the laser beams 11A and 11B on the sample 20 have been adjusted in the manner described above, the interference fringe 17 takes on the form of a small light spot P on the sample 20 (i.e. on the surface of the sample 20 or in the inside of the sample 20). The sample 20 is placed on a sample supporting member 19. The sample supporting member 19 can be moved by a vertical movement mechanism 21 along the directions indicated by the arrow Z, i.e. along the optical axis of the objective lens 18.

Figure 3:
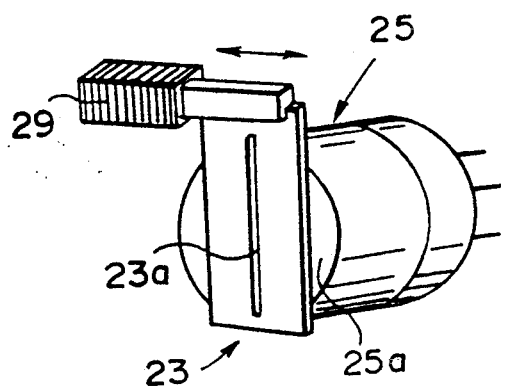
FIG. 3 is a perspective view showing part in the vicinity of a photodetector in the first embodiment shown in FIG. 1.

A laser beam 11', which has been reflected from the part of the sample 20 exposed to the light spot P, is reflected by the semi-transparent mirror 16 and is then condensed by a condensing lens 22. In this manner, a point image Q is formed. A slit plate 23 is located at the position at which the point image Q is formed. As illustrated in FIG. 3, the slit plate 23 has a slit 23a, which extends vertically. The point image Q is detected by a photodetector 25 through the slit 23a. The photodetector 25 has a wide light receiving surface 25a and may be constituted of, e.g. a photomultiplier. Therefore, a signal S representing the brightness of the point image Q is generated by the photodetector 25. Because the point image Q is detected through the slit 23a, a halo occurring around the point image Q and the laser beam, which is scattered from the sample 20, can be blocked.

As described above, the laser beams 11A and 11B have been modulated with different modulation frequencies f1 and f2. Therefore, the interference fringe 17 moves in the direction along which the laser beams 11A and 11B are lined up. Therefore, the light spot P scans the sample 20 in main scanning directions indicated by the arrow X. As the light spot P scans the sample 20 in the main scanning directions, the point image Q moves along the slit 23a of the slit plate 23. Wherever the point image Q may move, it can impinge upon the wide light receiving surface 25a of the photodetector 25. The light spot P thus scans the sample 20 in the main scanning directions, and at the same time the laser beams 11A and 11B are deflected by the galvanometer mirror 14. Therefore, the light spot P is also caused to scan the sample 20 in sub-scanning directions indicated by the arrow Y, which directions are approximately normal to the main scanning directions indicated by the arrow X.

In the manner described above, a time-serial signal S representing a two-dimensional image of the sample 20 is generated by the photodetector 25. The signal S is fed to a signal processing circuit 26, which receives a synchronizing signal from a control circuit 24. By way of example, the signal processing circuit 26 integrates the signal S with a predetermined period and in synchronization with the main scanning and the sub-scanning with the light spot P. In this manner, a signal Sp, which has been divided into picture elements, is obtained.

The control circuit 24 also feeds synchronizing signals to an operating circuit 27A for the AOM 13A, an operating circuit 27B for the AOM 13B, and a galvanometer mirror operating circuit 28. The synchronizing signals are used to synchronize the main scanning and the sub-scanning of the light spot P with each other.

As the light spot P scans in the sub-scanning directions, the position, at which the point image Q is formed, moves in directions approximately normal to the slit 23a. In order to follow the movement of the point image Q, the slit plate 23 is moved in the directions indicated by the arrow Y, which directions are approximately normal to the slit 23a. By way of example, a piezo-electric device 29 is used for this purpose. The control circuit 24 feeds a synchronizing signal to an operating circuit 30 for the piezo-electric device 29 in order to synchronize the movement of the slit plate 23 and the sub-scanning of the light spot P with each other.

In order that the sample 20 may not be simultaneously exposed to a plurality of light spots, only a single interference fringe 17 should preferably be formed. The number, N, of the interference fringes is calculated with the formula $$N = 1.27 W/D$$

where D represents the beam diameter of the laser beams 11A and 11B, and W represents the distance between the laser beams 11A and 11B. Therefore, by appropriately adjusting the beam diameter of the laser beams 11A and 11B and the distance between the laser beams 11A and 11B, only a single interference fringe 17 can be formed.

As described above, the main scanning frequency is calculated from the formula $\Delta f = f2 - f1$. By way of example, in cases where $f2 = 3.15$ MHz and $f1 = 1.575$ MHz, the main scanning frequency becomes equal to $\Delta f = 1.575$ MHz. In such cases, if the number of the main scanning lines is 500, a single microscope image can be formed within a time which is calculated with the formula $500 \times 1/(1.575 \times 10^6)$ second $= 0.317$ millisecond.

In this embodiment, the sample supporting member 19 can be moved by the vertical movement mechanism 21 in the directions indicated by the arrow Z, which directions are normal to the main scanning directions indicated by the arrow X and the sub-scanning directions indicated by the arrow Y. The two-dimensional scanning with the light spot P is carried out each time the sample 20 is moved a predetermined distance along the directions indicated by the arrow Z. In this manner, only the information at the focusing plane can be detected by the photodetector 25. The signals S, S, . . . generated for a plurality of focusing planes by the photodetector 25 may be stored on a frame memory. In this manner, a three-dimensional image can be reconstructed from the signals S, S, . . ., which represents the image information at the plurality of the focusing planes within the range of movement of the sample 20 along the directions indicated by the arrow Z.

In cases where a three-dimensional image is reconstructed in the manner described above from, for example, 500 two-dimensional images, if the time required for a single two-dimensional image to be formed is equal to 0.317 millisecond, the 500 two-dimensional images can be formed within the time of as short as approximately 0.16 second.

Figure 4:
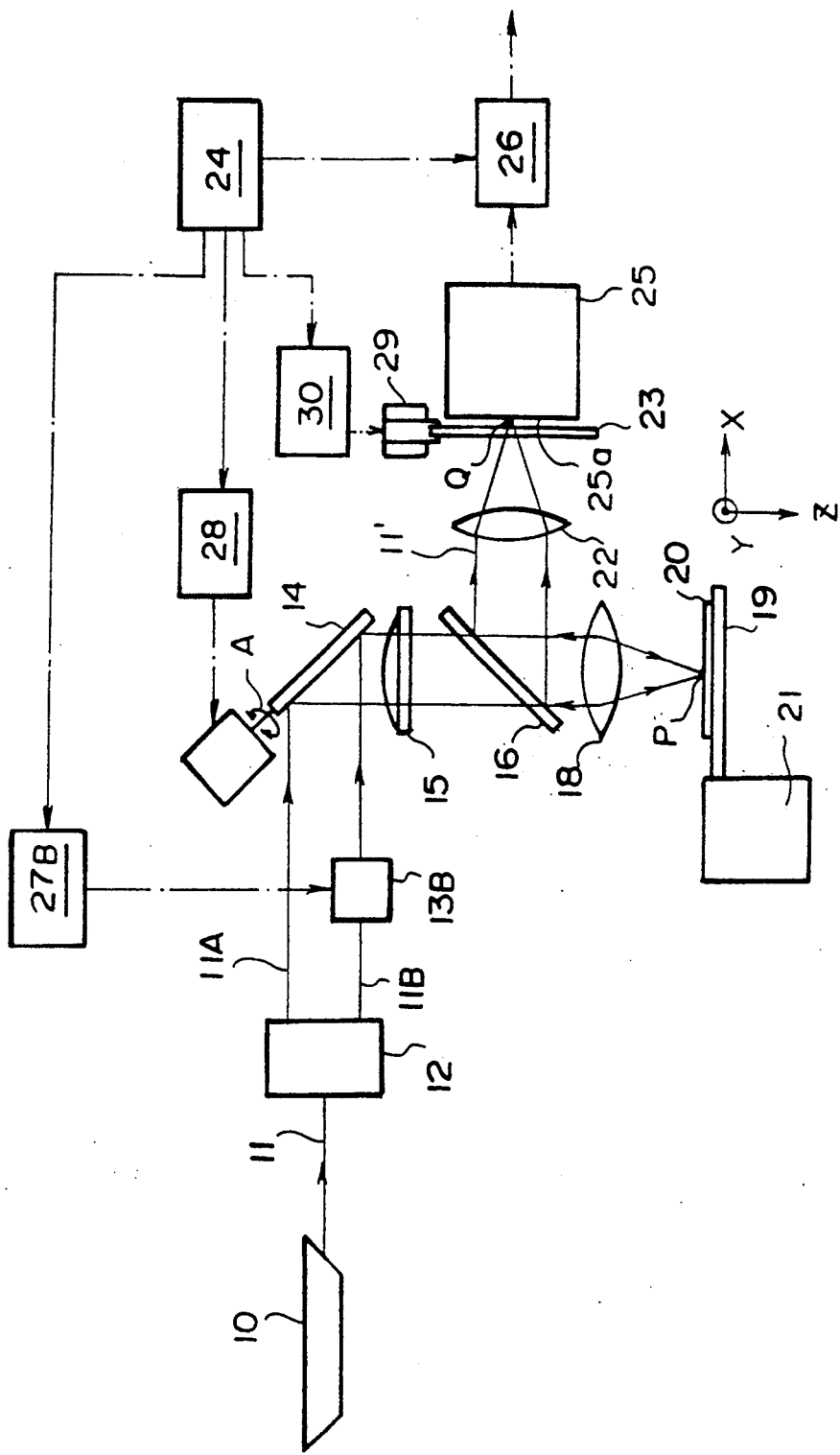
FIG. 4 is a schematic side view showing a second embodiment of the scanning microscope in accordance with the present invention.

A second embodiment of the scanning microscope in accordance with the present invention will be described hereinbelow with reference to FIG. 4. In FIG. 4, similar elements are numbered with the same reference numerals with respect to FIG. 1.

In the second embodiment, only the laser beam 11B is passed through the AOM 13B, and the intensity of the laser beam 11B is regularly modulated with the modulation frequency f2. The other laser beam 11A is not modulated, and therefore $f1 = 0$. Therefore, the main scanning frequency becomes equal to $\Delta f = f2$.

In the embodiments described above, the slit plate 23 is moved in synchronization with the sub-scanning of the light spot P. Alternatively, the rear surface of the galvanometer mirror 14 may be constituted as a reflection surface. The laser beam 11', which has been reflected from the sample 20, may be guided to the rear surface of the galvanometer mirror 14 and reflected and deflected thereby in ways which cancel the deflection of the laser beams 11A and 11B. In this manner, the movement of the slit plate 23 may be made unnecessary. Also, any of known means other than the AOM may be employed as the modulator for modulating the laser beam 11A or 11B.

Also, in the aforesaid embodiments, the optical device, which adjusts the beam profiles of the laser beams 11A and 11B on the sample 20 such that the beam profiles have a flat shape which is long in the direction along which the laser beams 11A and 11B are lines up, is constituted of the cylindrical lens 15 and the objective lens 18. Alternatively, any of other devices may be employed as said optical device.

The sub-scanning with the light spot P can also be carried out with a light deflector other than the galvanometer mirror 14. Alternatively, the sub-scanning with the light spot P may be carried out by moving the sample 20 with respect to the laser beams 11A and 11B.

The scanning microscope in accordance with the present invention may also be embodied as a transmission type scanning microscope and a scanning microscope for the formation of a color image.

Also, the scanning mechanisms employed in the aforesaid embodiments of the scanning microscope in accordance with the present invention are also applicable when the scanning is to be carried out in apparatuses other than microscopes. For example, the scanning mechanisms described above may be employed when the scanning is to be carried out during the writing of information in memories, the reading of information from memories, and the detection of video or audio signals from recording media.

I claim:

1. A scanning microscope comprising:
   i) an objective lens for converging a laser beam, which serves as a light beam irradiated to a sample, to a small light spot on said sample, ii) a scanning mechanism for scanning said light spot on said sample in a main scanning direction and a sub-scanning direction, and iii) a means for photoelectrically detecting the light beam, which is radiated out of said sample during the scanning, and thereby generating an image signal representing an enlarged image of said sample, wherein said scanning mechanism is provided a) a beam splitting means, which splits said laser beam into two laser beams such that center points of two said laser beams deviate from each other, two said laser beams being caused to impinge upon said objective lens, b) a light modulating means, which regularly modulates the intensity of at least one of two said laser beams such that the modulation frequency varies for two said laser beams, and c) an optical device, which adjusts the beam profiles of the laser beams on said sample such that the beam profiles have a flat shape which is long in the direction along which two said laser beams are lined up.

2. A scanning microscope as defined in claim 1 wherein said light modulating means is constituted of at least one acousto-optic modulator.

3. A scanning microscope as defined in claim 1 wherein said optical device is constituted of a cylindrical lens and said objective lens.

4. A scanning mechanism having an objective lens for converging a laser beam, which serves as a light beam irradiated to a material to be scanned, to a small light spot on said material to be scanned, said light spot being caused to scan said material, which is to be scanned, in a main scanning direction and a sub-scanning direction, wherein the improvement comprises the provision of a main scanning means which is composed of:

a) a beam splitting means, which splits said laser beam into two laser beams such that center points of two said laser beams deviate from each other, two said laser beams being caused to impinge upon said objective lens, b) a light modulating means, which regularly modulates the intensity of at least one of two said laser beams such that the modulation frequency varies for two said laser beams, and c) an optical device, which adjusts the beam profiles of the laser beams on said material to be scanned such that the beam profiles have a flat shape which is long in the direction along which two said laser beams are lined up.

5. A scanning mechanism as defined in claim 4 wherein said light modulating means is constituted of at one acousto-optic modulator.

6. A scanning mechanism as defined in claim 4 wherein said optical device is constituted of a cylindrical lens and said objective lens.

* * * * *